INVENTORS
BENNY B. MATHIAS & ELLSWORTH M. MURLEY JR.
BY W. A. Schaich &
Charles S. Lynch
ATTORNEYS

INVENTORS
BENNY B. MATHIAS & ELLSWORTH M. MURLEY JR.

ATTORNEYS

INVENTORS
BENNY B. MATHIAS & ELLSWORTH M. MURLEY JR.

ATTORNEYS

United States Patent Office 3,154,194
Patented Oct. 27, 1964

3,154,194
INSPECTING FILLED CONTAINERS FOR VACUUM
Benny B. Mathias and Ellsworth M. Murley, Jr., Toledo, Ohio, assignors to Owens-Illinois Glass Company, a corporation of Ohio
Filed Dec. 23, 1960, Ser. No. 78,064
29 Claims. (Cl. 209—111.5)

This invention relates to filled hollow containers, such as glass containers containing food, and particularly to inspecting such containers to determine whether or not the vacuum in the head space thereof is satisfactory.

In the packing of food and other perishable commodities in containers such as hollow glass containers, it is necessary to provide a head space in the upper end of the container to permit expansion of the contents due to temperature changes. Because of the perishable nature of the goods, the head space must be either evacuated or filled with inert gas prior to sealing the container with a cap or other closure. When a vacuum is used, the containers must be inspected in order to insure that each container has the desired vacuum otherwise, spoilage of the contents will occur. One method of inspection that has been commonly used is to tap the containers. Obviously, such a method is slow, involves human error, and cannot be relied upon to produce satisfactory results at the high rates at which modern day production lines operate.

It is therefore an object of this invention to provide a method and apparatus for inspecting filled hollow containers which have liquid type contents for the presence of vacuum therein.

It is a further object of the invention to provide such a method and apparatus whereby the inspection is conducted quickly and efficiently at high speeds.

It is a further object of the invention to provide such a method and apparatus wherein the inspection is conducted with a minimum of mechanical and electrical parts.

It is a further object of the invention to provide such a method and apparatus wherein digital pulse circuits are used.

Basically, the invention comprises supporting the container in generally upright condition so that the head space is adjacent the upper end thereof and accelerating the container downwardly momentarily at such a rate as to produce, because of the hydrodynamic cavitation, a sound pulse if the vacuum in the head space is satisfactory. A microphone is provided adjacent the container and produces a signal if the vacuum is satisfactory. Circuitry is associated with the apparatus to reject the container if no sound pulse is produced. In order to avoid false rejections because of extraneous noises, the microphone circuit is conditioned so that it is energized only during a portion of the acceleration of the container. In addition, filter means are provided so that the microphone is sensitive only to frequencies within which the sound pulse exists and is insensitive to other sound made by movement of the contents in the container or by extraneous noises. Digital electronic circuits are utilized in order to make the apparatus more reliable.

Figure 1:
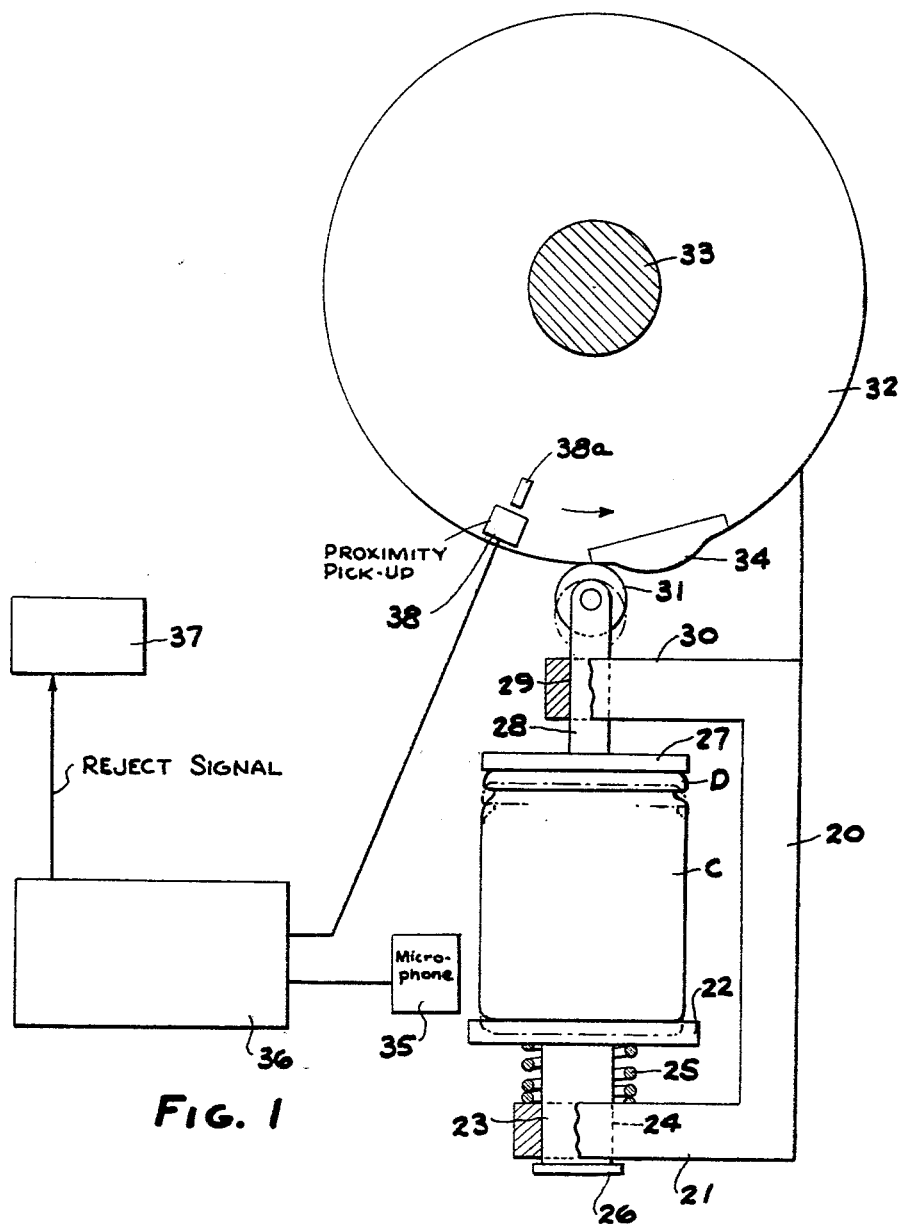
FIG. 1 is a partly diagrammatic part sectional elevation of an apparatus embodying the invention.

Referring to FIG. 1, the apparatus for inspecting the containers for vacuum comprises a fixed frame 20 which includes a horizontal arm 21 on which a spring supported pad 22 is positioned. As shown in FIG. 1, the pad 22 includes an integral shaft 23 that extends vertically through an opening 24 in the arm 21 of frame 20. A coil spring 25 is interposed between the underside of the pad 22 and the arm 21 to yieldingly urge the pad 22 upwardly. A flange 26 on the lower end of the shaft 23 limits the upward movement of the pad 22.

Pad 22 is adapted to support container C which is brought successively to the pad by a suitable apparatus such as shown in the patent to Fedorchak 2,682,802. A plate 27 is mounted on a plunger 28 extending through an opening 29 in an arm 30 on the frame 20 and is adapted to engage the upper end of the container C and particularly the cap D. Plunger 28 is formed with a cam follower roller 31 on the upper end thereof which continuously engages the periphery of a cam wheel 32 that is fixed to a shaft 33. The cam wheel 32 includes a projection 34 that momentarily forces the plunger 28 downwardly during the rotation of the cam thereby momentarily accelerating the container C downwardly against the action of the spring 25 to accelerate the container and its contents.

The container C is filled with food or other perishable commodities of the liquid type. The term "liquid type" as used herein is intended to cover not only pure liquids but, in addition, liquids which includes suspensions or mixtures with solids such as catsup, pea and bean soups and the like.

Depending upon the contents of the container, the container C is accelerated at a predetermined rate sufficient to cause a sound pulse, because of hydrodynamic cavitation, if the vacuum in the head space is satisfactory and insufficient to cause a sound pulse if the vacuum in the head space is unsatisfactory. Experimentation will quickly determine the degree of acceleration needed. Factors which influence the acceleration needed are the nature of the contents and the vacuum of the head space.

A microphone 35 is positioned adjacent the container C and out of contact therewith to pick up the sound pulse. If a sound pulse is produced, the container is passed, but if sound pulse is not produced, the electronic apparatus 36 produced a reject signal which, in turn, energizes a reject mechanism 37 that rejects the container either while it is on the pad 22 or at a subsequent position in its movement after removal from the pad 22.

In order to avoid false signals from extraneous noises in the surroundings, the microphone circuit is conditioned only during the inspecting operation and particularly during the acceleration of the container C. Specifically, a proximity pick-up 38, such as an electromagnet, is positioned adjacent the cam 32 and is adapted to be energized by an armature 38a on cam 32 just prior to its movement into contact with the roller 31 thereby producing a pulse that is caused to condition a microphone circuit in the electronic apparatus 36. Projection 34 and cam 32 are made of a non-magnetic material so that they will not energize pick-up 38.

In addition, filter means are provided so that the microphone is sensitive only to frequencies within which the sound pulse exists and is insensitive to other sound made by movement of the contents in the container or by extraneous noises.

Figure 2:
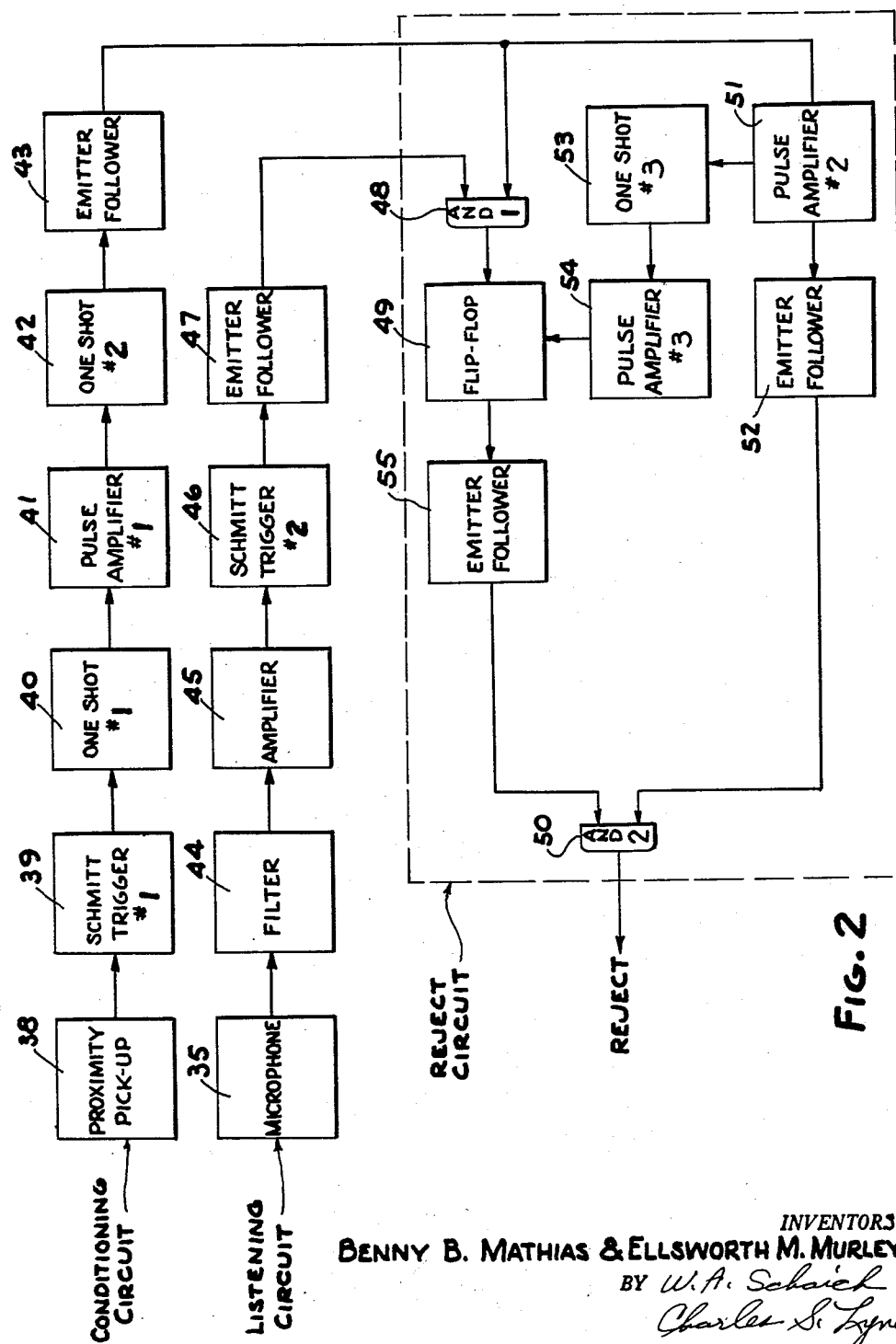
FIG. 2 is a block diagram of the digital electronic circuit.

The block diagram for the electronic apparatus is shown in FIG. 2. For purposes of convenience, the system may be considered as comprising a conditioning circuit, a listening circuit and a reject pulse generating circuit.

Figure 3:
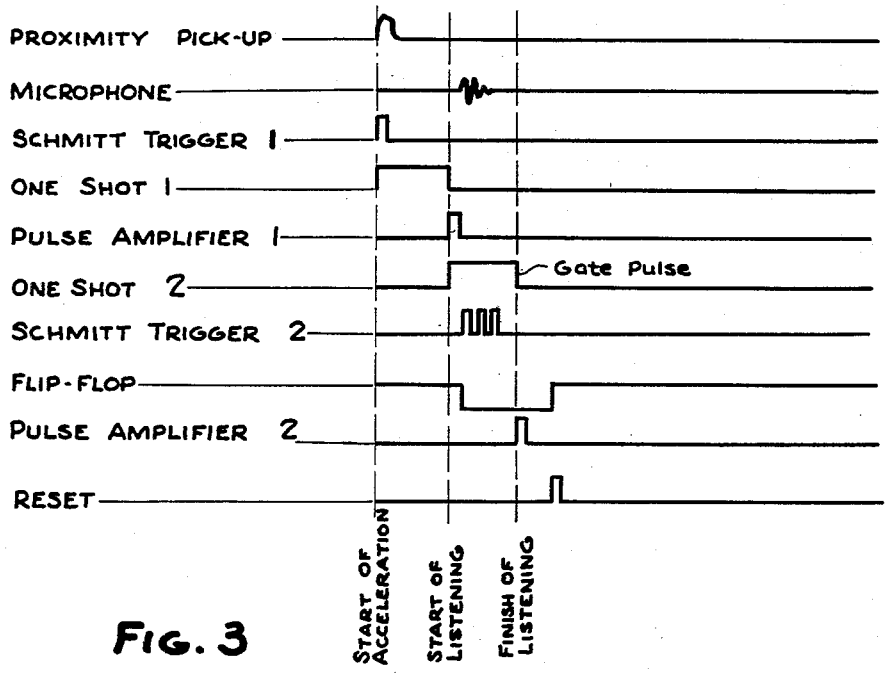
FIG. 3 is a wave diagram of the electronic circuit.

Referring to FIGS. 2 and 3, the conditioning circuit comprises proximity pick-up 38 which is energized to generate a pulse at the instant the container is accelerated downwardly by cam 32. This pulse is shaped into a standard digital pulse by a Schmitt trigger 39 which, in turn, drives a monostable multivibrator or one shot 40 producing a pulse of predetermined width. The trailing edge of the pulse from one shot 40 produces the minimum listening time for the listening circuit as presently described. The pulse from the one shot 40 is fed to a pulse amplifier 41 which produces a narrow pulse at the trailing edge of the pulse from the one shot 40. This pulse triggers one shot 42 which, in turn, transmits a pulse through emitter follower 43 to the reject pulse generating circuit (FIG. 3). One shot 40 and amplifier 41 thus form a delay circuit.

The listening circuit comprises microphone 35 which is energized when a sound pulse is produced by the container to feed a signal to the filter 44. The filter 44 is a five kilocycle high pass filter with rather sharp cut off characteristics which when coupled with the high cut off characteristics of the microphone, in the range of ten kilocycles, produces a one octave band of five to ten kilocycles to which the system is sensitive. This frequency is within the range of that within which the sound pulse from the container occurs. This minimizes the effects of extraneous noise or noise of the contents of the container and permits the microphone to pick up only the sound pulse caused by hydrodynamic cavitation. The signal from the filter is amplified by an amplifier 45 and converted to standard digital pulses by Schmitt trigger 46. These pulses are transmitted by emitter follower 47 to the reject circuit.

The reject circuit includes an "and" gate 48. If the pulses from the Schmitt trigger 46 of the listening circuit occur during the time interval of the pulse from one shot 42 of the conditioning circuit, a pulse passes through "and" gate 48, triggering a flip-flop 49 and transmitting a pulse to an "and" gate 50 through an emitter follower 55 to disable "and" gate 50, which is normally "on." Pulse amplifier 51 cooperates with one shot 42 to provide a delay circuit which produces a narrow pulse at the trailing edge of the pulse from the one shot 42. If "and" gate 50 has been disabled, then the pulse from amplifier 51, passing through an emitter follower 52, will not pass through "and" gate 50. If, on the other hand, microphone 35 in the listening circuit has not received a sound pulse due to improper vacuum in the container, "and" gate 48 will not permit a pulse to pass triggering flip-flop 49 and therefore "and" gate 50 will not be disabled. In that event, the pulse from amplifier 51 will pass through "and" gate 50 resulting in the rejection of the container. A further delay circuit comprising a one shot 53 and a pulse amplifier 54 is provided in the reject circuit and produces a delayed pulse which resets flip-flop 49.

The electronic components are of well-known types and typical circuits therefor are shown in FIGS. 4-9.

Figure 4:
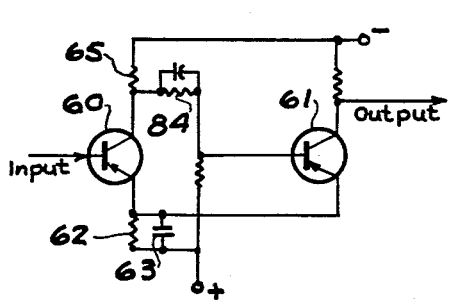
FIG. 4 is a wiring diagram of a Schmitt trigger used in the electronic circuit.

Schmitt triggers 40, 46 can be of the type shown in FIG. 4. As shown in FIG. 4, the circuit for such devices comprises transistors 60, 61. Transistor 60 is cut off and transistor 61 is saturated. The cut-off condition of transistor 60 is assured because the two transistors are emitter coupled by the resistor 62 and capacitor 63. The current flowing through the second transistor 61 causes a voltage drop through resistor 62 which makes the emitter of the first transistor 60 negative with respect to its base. Thus, the transistor 61 is reversed biased. The second transistor 61 is forward biased from the collector load resistor 65 of the first transistor 60 and the resistor 64 connecting the load resistor 65 in the base of the second transistor 61. In its quiescent state, the first transistor 60 is cut off and the second transistor 61 is saturated. The small amount of cut-off current in the first transistor 60 causes a slight voltage drop across its collector load resistor 65 clamping the output at a negative voltage.

When a negative pulse is applied to a point called A.C. input, the first transistor 60 becomes forward biased and begins to conduct. At the same time, the voltage drop across its load resistor 65 is reduced. This regenerative action continues until the first transistor 60 is saturated and the second transistor 61 is cut off. When this happens, the point titled inverted output is at a lesser voltage than before. When the input pulse at A.C. input is removed, the reversed bias is again applied to the first transistor and the circuit will restore itself to its original condition. Circuits such as shown in FIG. 20 are also called squaring amplifiers. The device described is manufactured by the Engineered Electronics Company, Santa Ana, California under the designation T-106.

Figure 5:
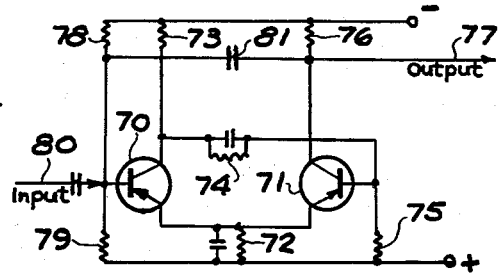
FIG. 5 is a wiring diagram of a one-shot used in the electronic circuit.

One shots or monostable multivibrators 40, 42 and 53 can be of the type shown in FIG. 5. The purpose of such devices is to receive a pulse and convert it to a pulse of standard amplitude and standard width. As shown in FIG. 5, the one shot comprises transistors 70, 71. Initially, transistor 70 is conducting and transistor 71 is cut off. The cut off of transistor 71 is provided by a voltage drop across resistor 72, and the combined resistances 73, 74 and 75. This causes a reverse bias on transistor 71 cutting it off. The cut-off current through resistor 75 clamps the output 77 to a predetermined voltage. Transistor 70 is held in saturation by a voltage divider 78, 79 which forward biases transistor 70.

When a positive pulse is fed to input 80, transistor 70 conducts less. As a result, the drop across resistor 73 decreases and the transistor 71 become forward biased and begins to conduct. This action continues until transistor 70 is cut off and transistor 71 is conducting. This raises the voltage at output 77 to a less negative voltage. At the same time, transistor 70 is held at a cut off by capacitor 81 which has been charged. The capacitor charge holds transistor 70 at cut off. Capacitor 81 discharges exponentially through resistor 77. As soon as the reverse bias is removed from transistor 70 by discharge of capacitor 81, transistor 70 will begin to conduct this cutting off transistor 71 and restoring the circuit to its original condition. The output pulse is controlled by the time constant of resistance 78 and capacitor 81.

Figure 6:
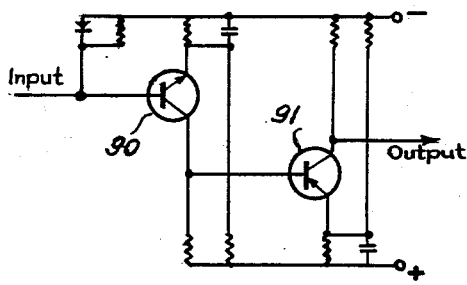
FIG. 6 is a wiring diagram of a pulse amplifier used in the electronic circuit.

Pulse amplifiers 41, 51 and 54 can be of the type shown in FIG. 6 and comprise transistorized amplifiers producing a standardized positive going pulse. Each amplifier comprises transistors 90, 91. The pulse amplifier shown is manufactured by Engineered Electronics Company, Santa Ana, California under the designation T-118.

Figure 7:
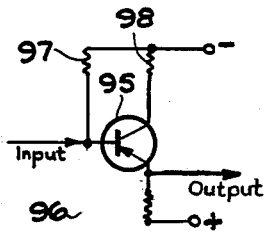
FIG. 7 is a wiring diagram of an emitter follower used in the electronic circuit.

Emitter followers 43, 47, 52 and 55 can be of the type shown in FIG. 7. Each emitter follower is roughly the transistor equivalent of a cathode follower. The emitter follower comprises a transistor 95, the base of which is clamped to a predetermined negative voltage corresponding to the device to which it is connected. When the input corresponds to this voltage, the drop across the resistor 96 corresponds to the same voltage. When the input is at a lesser negative voltage, the transistor 95 conducts less and the output rises to a corresponding lesser voltage. The resistance 97 provides bias to the transistor 95. The resistance 98 helps establish the direct current level in the output which is at a lower impedance than the input.

Figure 8:
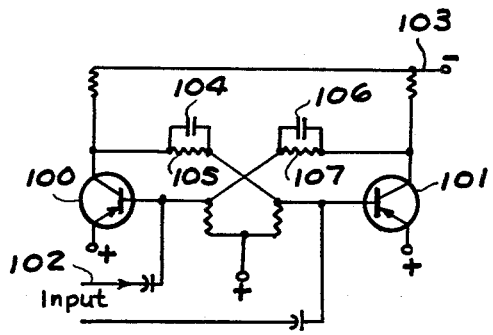
FIG. 8 is a wiring diagram of a flip-flop used in the electronic circuit.

The flip-flop 49 can be of the type shown in FIG. 8. The flip-flop is of conventional construction commonly known as a bistable multivibrator or binary which is initially at rest in either one of two stable states. When triggered by an input pulse, the circuit switches to the second stable state where it remains until triggered by another pulse. As shown in FIG. 8, the flip-flop 49 comprises transistors 100, 101. Assuming that transistor 100 is cut off and transistor 101 is conducting, a negative trigger pulse applied to input 102 causes transistor 100 to conduct. The rise in collector current in transistor 100 causes the collector voltage to fall. This change in voltage is coupled to the base of transistor 101 and reduces its forward bias so that conduction in transistor 101 begins to decrease. The collector current decreases and the collector voltage changes from zero to a negative value approaching the value of the voltage at 103. This change in voltage is coupled to the base transistor 100 making the base more negative and increasing the conduction of the transistor.

Figure 9:
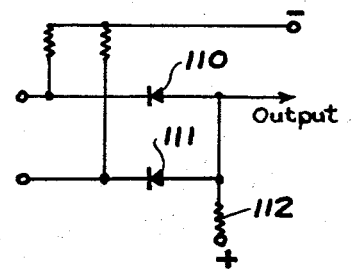
FIG. 9 is a wiring diagram of an "and" gate used in the electronic circuit.

The "and" gate can be of the type shown in FIG. 9 and is intended to give an output pulse if the input pulses are coincident on the two inputs thereof. As shown in FIG. 9, the "and" gate comprises diodes 110, 111. Both diodes 110, 111 are forward biased by the supply voltage and resistor chain. Current flows through the diodes clamping the voltage across the resistor 112 at a given level. If a positive pulse appears on either input, that diode will be reverse biased and will not conduct. However, the other diode will continue to conduct and the voltage across the resistor 112 will remain clamped at its original value. Both inputs receive a positive pulse simultaneously, both diodes will be reverse biased and the voltage drop across the resistor 112 will rise, producing an output pulse. The output may then be fed to an emitter follower of the type shown in FIG. 7.

It can thus be seen that there has been provided a method and apparatus for quickly and easily inspecting a container having liquid type contents for determining whether or not the vacuum in the head space thereof is satisfactory. The inspection is conducted without direct contact of any electronic apparatus with the container. The use of digital pulse circuits minimizes the criticality of the electronic circuitry. The mechanical structure of the apparatus is simple and dependable.

We claim:

1. The method of checking the vacuum in the head space of sealed containers filled with substantially liquid type contents which comprises supporting the container with the head space at the upper end of the container, momentarily and rapidly accelerating the container and its contents bodily downwardly at a predetermined rate sufficient to cause a sound pulse by hydrodynamic cavitation of the contents if the vacuum in the head space is satisfactory and insufficient to cause such a sound pulse if the vacuum in the head space is unsatisfactory, and rejecting the container if such a sound pulse is not produced.

2. The method of checking the vacuum in the head space of sealed containers filled with substantially liquid type contents which comprises yieldably supporting the container in a generally upright position with the head space at the upper end of the container, momentarily and rapidly applying a downward force to the upper end of the container to accelerate the container and its contents bodily downwardly at a predetermined rate sufficient to cause a sound pulse by hydrodynamic cavitation of the contents if vacuum in the head space is satisfactory and insufficient to cause such a sound pulse if the vacuum in the head space is unsatisfactory, said sound pulse differing from the normal sounds due to movement of the contents, and rejecting the container if such a sound pulse is not produced.

3. The method of checking the vacuum in the head space of sealed containers filled with substantially liquid type contents which comprises supporting the container in a generally upright position with the head space at the upper end thereof, momentarily and rapidly accelerating the container and its contents bodily downwardly at a predetermined rate sufficient to cause a sound pulse by hydrodynamic cavitation of the contents if the vacuum in the head space is satisfactory and insufficient to cause such a sound pulse if the vacuum in the head space is unsatisfactory, conditioning a circuit at the inception of the downward movement of the container, said sound pulse differing from the normal sounds due to movement of the contents, and causing said circuit to produce a reject signal if such a sound pulse is not produced.

4. The method of checking the vacuum in the head space of sealed containers filled with substantially liquid type contents which comprises supporting the container in a generally upright position with the head space at the upper end thereof, momentarily accelerating the container and its contents bodily downwardly at a predetermined rate sufficient to cause a sound pulse by hydrodynamic cavitation of the contents if the vacuum in the head space is satisfactory and insufficient to cause such a sound pulse if the vacuum in the head space is unsatisfactory, positioning a microphone adjacent the container, said sound pulse differing from the normal sounds due to movement of the contents, causing such a sound pulse produced by a container having satisfactory vacuum to energize the microphone, and rejecting the container when a signal is not produced by the microphone.

5. The method of checking the vacuum in the head space of sealed containers filled with substantially liquid type contents which comprises supporting the container in a generally upright position with the head space at the upper end thereof, momentarily and rapidly accelerating the container and its contents bodily downwardly at a predetermined rate sufficient to cause a sound pulse by hydrodynamic cavitation of the contents if the vacuum in the head space is satisfactory and insufficient to cause such a sound pulse if the vacuum in the head space is unsatisfactory, said sound pulse differing from the normal sounds due to movement of the contents, generating an electrical signal at the inception of the downward movement of the container, creating a second electrical signal when such a sound pulse is produced by a container having a satisfactory vacuum, and rejecting the container if a second signal is not produced by such a sound pulse at a time coincident with the first electrical signal generated at the inception of the downward movement.

6. The method of checking the vacuum in the head space of sealed containers filled with substantially liquid type contents which comprises supporting the container in a generally upright position with the head space at the upper end thereof, momentarily and rapidly accelerating the container and its contents bodily downwardly at a predetermined rate sufficient to cause a sound pulse by hydrodynamic cavitation of the contents if the vacuum in the head space is satisfactory and insufficient to cause such a sound pulse if the vacuum in the head space is unsatisfactory, positioning a microphone adjacent the container, said sound pulse differing from the normal sounds due to movement of the contents, conditioning the microphone circuit at the inception of the movement downwardly so that the microphone is capable of producing a signal, causing the sound pulse to energize the microphone and create a signal, and rejecting the container if the microphone circuit does not produce a signal during the time that the microphone circuit is conditioned by the downward movement of the container.

7. An apparatus for checking the vacuum in the head space of a sealed container filled with substantially liquid type contents which comprises means for supporting the container in upright position with the head space adjacent the upper end of the container, means for momentarily accelerating the container and its contents bodily downwardly at a predetermined rate sufficient to produce a sound pulse by hydrodynamic cavitation of the contents if the vacuum in the head space is satisfactory and insufficient to produce such a sound pulse if the vacuum in the head space is unsatisfactory, said sound pulse differing from the normal sounds due to movement of the contents, means positioned adjacent said container and adapted to create a signal if such a sound pulse is produced, and means for rejecting the container if a sound pulse is not produced.

8. The combination set forth in claim 7 including means for conditioning said latter reject means upon the initiation of the accelerating movement of the container.

9. An apparatus for checking the vacuum in the head space of a sealed container filled with substantially liquid type contents which comprises means for yieldably supporting the container in generally upright position with the head space adjacent the upper end thereof, means for momentarily and rapidly applying a downward accelerating force on the container and its contents at a predetermined rate sufficient to cause a sound pulse by hydrodynamic cavitation of the contents if the vacuum in the head space is satisfactory and insufficient to cause such a sound pulse if the vacuum in the head space is unsatisfactory, said sound pulse differing from the normal sounds due to movement of the contents, and means positioned adjacent said container for creating a reject signal if a sound pulse is not produced.

10. The combination set forth in claim 9 wherein said means for accelerating the container comprises means for applying a force momentarily to the upper end of the container.

11. An apparatus for checking the vacuum in the head space of a sealed container filled with substantially liquid type contents which comprises means for supporting a container in upright position with the head space thereof adjacent the upper end thereof, means for momentarily accelerating the container and its contents bodily in a downward direction at a predetermined rate sufficient to produce a sound pulse by hydrodynamic cavitation of the contents if the vacuum in the head space is satisfactory and insufficient to produce a sound pulse by hydrodynamic cavitation if the vacuum in the head space is unsatisfactory, a microphone, a microphone circuit, means for supporting said microphone adjacent said container to thereby create a signal in the microphone circuit in the event that a sound pulse is produced, and means for conditioning the microphone circuit only during a predetermined time interval during the downward acceleration of the container.

12. The combination set forth in claim 11 wherein said means for conditioning said microphone circuit comprises a proximity sensitive device adapted to be energized by said means for accelerating said container downwardly, a conditioning circuit associated with said device and adapted to condition said microphone circuit.

13. The combination set forth in claim 12 including filter means for adjusting the sensitivity of said microphone circuit to a range between 5 and 10 kilocycles.

14. An apparatus for checking the vacuum in the head space of a sealed container filled with substantially liquid type contents which comprises means for supporting a container in upright position with the head space thereof adjacent the upper end thereof, means for momentarily accelerating the container and its contents bodily in a downward direction at a predetermined rate sufficient to produce a sound pulse by hydrodynamic cavitation of the contents if the vacuum in the head space is satisfactory and insufficient to produce a sound pulse if the vacuum in the head space is unsatisfactory, a microphone, a microphone circuit, means for supporting said microphone adjacent said container to thereby create a signal in said microphone circuit in the event that a sound pulse is produced, means for conditioning the microphone circuit only during a predetermined time interval during the downward acceleration of the container, and means for rejecting the container when the signal from said conditioning means is coincident with the absence of a signal from said microphone.

15. An apparatus for checking the vacuum in the head space of a sealed container filled with substantially liquid type contents which comprises means for supporting a container in generally upright position with the head space adjacent the upper end thereof, means for momentarily accelerating the container and its contents bodily downwardly at a predetermined rate sufficient to cause a sound pulse by the hydrodynamic cavitation of the contents if the vacuum in the head space is satisfactory and insufficient to cause a sound pulse if the vacuum in the head space is unsatisfactory, a sound sensitive device, means for mounting said device adjacent said container, said sound sensitive device including a first circuit adapted to produce a pulse if a sound pulse is produced upon the downward movement of the container, a proximity device adapted to be energized by said means for accelerating the container, a second circuit associated with said proximity device for producing a second pulse when the container is accelerated downwardly, and means including an "and" gate for rejecting the container if said first circuit produces no pulse when said second circuit produces a pulse and passing the container if a pulse is produced substantially simultaneously by said first circuit and said second circuit.

16. An apparatus for checking the vacuum in the head space of a sealed container filled with substantially liquid type contents which comprises means for supporting a container in generally upright position with the head space adjacent the upper end thereof, means for momentarily accelerating the container and its contents bodily downwardly at a predetermined rate sufficient to cause a sound pulse by hydrodynamic cavitation if the vacuum in the head space is satisfactory and insufficient to cause a sound pulse if the vacuum in the head space is unsatisfactory, a sound sensitive device, means for mounting said device adjacent said container, said sound sensitive device including a first circuit adapted to produce a signal if a sound pulse is produced upon the downward movement of the container, a proximity device adapted to be energized by said means for accelerating the container, a second circuit associated with said proximity device for producing a second pulse when the container is accelerated downwardly, and means including a first "and" gate to which a pulse is provided by said first circuit and said second circuit, said first "and" gate adapted to create a pulse if said pulses from said first circuit and said second circuit are coincident, and a second "and" gate to which the pulse from the first "and" gate is directed, said second "and" gate being normally adapted to be disabled by the pulse from said first "and" gate, said second "and" gate receiving a pulse from said second circuit whereby said second "and" gate produces a pulse when a pulse is produced by said second circuit and is not produced by said first circuit.

17. The combination set forth in claim 16 including a flip-flop circuit associated with said first "and" gate, and means for resetting said flip-flop circuit after a predetermined time interval.

18. The combination set forth in claim 17 wherein said latter resetting means is energized by the pulse from the second circuit.

19. The combination set forth in claim 16 including a first delay circuit in said second circuit in advance of said first "and" gate and a second delay circuit in said second circuit in advance of said second "and" gate.

20. The method of checking the vacuum in the head space of sealed containers filled with substantially liquid type contents which comprises supporting the container in a generally upright position with the head space at the upper end thereof, momentarily accelerating the container and its contents bodily downwardly at a predetermined rate sufficient to cause a sound pulse by hydrodynamic cavitation of the contents if the vacuum in the head space is satisfactory and insufficient to cause a sound pulse if the vacuum in the head space is unsatisfactory, generating a first electrical pulse of predetermined width at the inception of the downward movement of the container, generating a second electrical pulse when a sound pulse is produced by a container having a satisfactory vacuum, and rejecting the container if a second pulse is not produced at a time coincident with the first pulse generated at the inception of the downward movement.

21. The method of checking the vacuum in the head space of sealed containers filled with substantially liquid type contents which comprises supporting the container in a generally upright position with the head space at the upper end thereof, momentarily and rapidly accelerating the container and its contents bodily downwardly at a predetermined rate sufficient to cause a sound pulse by hydrodynamic cavitation of the contents if the vacuum in the head space is satisfactory and insufficient to cause such a sound pulse if the vacuum in the head space is unsatisfactory, said sound pulse differing from the normal sounds due to movement of the contents, providing a listening circuit sensitive to sound pulses within the range of five to ten kilocycles only, causing the sound pulse produced by a container having satisfactory vacuum to energize said listening circuit if it lies within the range of five to ten kilocycles, and rejecting the container when the listening circuit is not energized by such a sound pulse.

22. An apparatus for checking the vacuum in the head space of a sealed container filled with substantially liquid type contents which comprises means for supporting the container in upright position with the head space adjacent the upper end of the container, means for momentarily and rapidly accelerating the container and its contents bodily downwardly at a predetermined rate sufficient to produce a sound pulse by hydrodynamic cavitation of the contents if the vacuum in the head space is satisfactory and insufficient to produce such a sound pulse if the vacuum in the head space is unsatisfactory, said sound pulse differing from the normal sounds due to movement of the contents, means positioned adjacent said container and adapted to create a signal if a sound pulse having a frequency of five to ten kilocycles is produced, and means for rejecting the container if a sound pulse is not produced.

23. An apparatus for checking the vacuum in the head space of a sealed container filled with substantially liquid type contents which comprises means for supporting a container in generally upright position with the head space adjacent the upper end thereof, means for momentarily accelerating the container and its contents bodily downwardly at a predetermined rate sufficient to cause a sound pulse by the hydrodynamic cavitation of the contents if the vacuum in the head space is satisfactory and insufficient to cause a sound pulse if the vacuum in the head space is unsatisfactory, a sound sensitive device, means for mounting said device adjacent said container, said sound sensitive device including a first circuit adapted to produce a pulse if a sound pulse is produced upon the downward movement of the container, a proximity device adapted to be energized by said means for accelerating the container, a second circuit associated with said proximity device for producing a second pulse of predetermined width when the container is accelerated downwardly, and means including an "and" gate for rejecting the container if said first circuit produces no pulse when said second circuit produces a pulse and passing the container if a pulse is produced substantially simultaneously by said first circuit and said second circuit.

24. The combination set forth in claim 23 wherein said first circuit is sensitive to frequencies ranging between five to ten kilocycles only.

25. The combination set forth in claim 23 wherein said first circuit includes a filter which passes frequencies of five to ten kilocycles only.

26. The combination set forth in claim 23 wherein said rejecting means includes a delay circuit.

27. An apparatus for checking the vacuum in the head space of a sealed container filled with substantially liquid type contents which comprises means for yieldably supporting the container in generally upright position with the head space adjacent the upper end thereof, means for momentarily applying a downward accelerating force on the container and its contents at a predetermined rate sufficient to cause a sound pulse by hydrodynamic cavitation of the contents if the vacuum in the head space is satisfactory and insufficient to cause a sound pulse if the vacuum in the head space is unsatisfactory, and means positioned adjacent said container for creating a reject signal if a sound pulse is not produced, said means for yieldingly supporting said container comprising a pad, and a spring yieldingly resisting the downward movement of said pad.

28. An apparatus for checking the vacuum in the head space of a sealed container filled with substantially liquid type contents which comprises means for yieldably supporting the container in generally upright position with the head space adjacent the upper end thereof, means for momentarily applying a downward accelerating force on the container and its contents at a predetermined rate sufficient to cause a sound pulse by hydrodynamic cavitation of the contents if the vacuum in the head space is satisfactory and insufficient to cause a sound pulse if the vacuum in the head space is unsatisfactory, and means positioned adjacent said container for creating a reject signal if a sound pulse is not produced, said means for accelerating the container comprising means for applying a force momentarily to the upper end of the container including a plate adapted to engage the upper end of the container, and a cam having an enlarged portion thereof adapted to momentarily engage the plate and thereby apply momentary downward force on the upper end of the container.

29. An apparatus for checking the vacuum in the head space of a sealed container filled with substantially liquid type contents which comprises means for yieldably supporting the container in generally upright position with the head space adjacent the upper end thereof, means for momentarily applying a downward accelerating force on the container and its contents at a predetermined rate sufficient to cause a sound pulse by hydrodynamic cavitation of the contents if the vacuum in the head space is satisfactory and insufficient to cause a sound pulse if the vacuum in the head space is unsatisfactory, and means positioned adjacent said container for creating a reject signal if a sound pulse is not produced, a proximity sensitive device, and means actuated by said device for conditioning said reject signal producing means so that it will produce a reject signal only when the container is being accelerated.

References Cited in the file of this patent
UNITED STATES PATENTS

| 1,869,067 | Malmquist | July 26, 1932 |
| 2,112,621 | Henszey | Mar. 29, 1938 |
| 2,635,746 | Gordon | Apr. 21, 1953 |